United States Patent [19]

Dimas

[11] Patent Number: 5,167,831

[45] Date of Patent: Dec. 1, 1992

[54] NON-IONIC SURFACTANTS PLUS FATTY-ACIDS AS DEWATERING AIDS FOR ALUMINA TRIHYDRATE

[75] Inventor: Peter A. Dimas, Wheaton, Ill.

[73] Assignee: Nalco Chemical Company, Naperville, Ill.

[21] Appl. No.: 718,078

[22] Filed: Jun. 20, 1991

[51] Int. Cl.$^5$ ............................................. B01D 37/03
[52] U.S. Cl. ..................... 210/728; 210/729; 210/732; 210/772; 210/778; 423/122; 423/131
[58] Field of Search ............... 210/727, 728, 729, 730, 210/772, 778, 732; 423/121, 122, 130, 131

[56] References Cited

U.S. PATENT DOCUMENTS

| | | | |
|---|---|---|---|
| 3,578,589 | 5/1971 | Hwa et al. | 210/701 |
| 4,039,466 | 8/1977 | Matsuda et al. | 210/729 |
| 4,097,390 | 6/1978 | Wang et al. | 252/60 |
| 4,323,365 | 4/1982 | Crosby et al. | 210/710 |
| 4,410,431 | 10/1983 | Roe | 210/728 |
| 5,011,612 | 4/1991 | Keeney | 210/772 |

OTHER PUBLICATIONS

CA99 (14):107048t.

*Primary Examiner*—Peter Hruskoci
*Attorney, Agent, or Firm*—Robert A. Miller; John G. Premo

[57] ABSTRACT

Tall oily fatty acids when combined with certain non-ionic surfactants having an HLB number from 10-14 are superior dewatering agents for Bayer Process alumina trihydrate filter cakes.

4 Claims, 1 Drawing Sheet

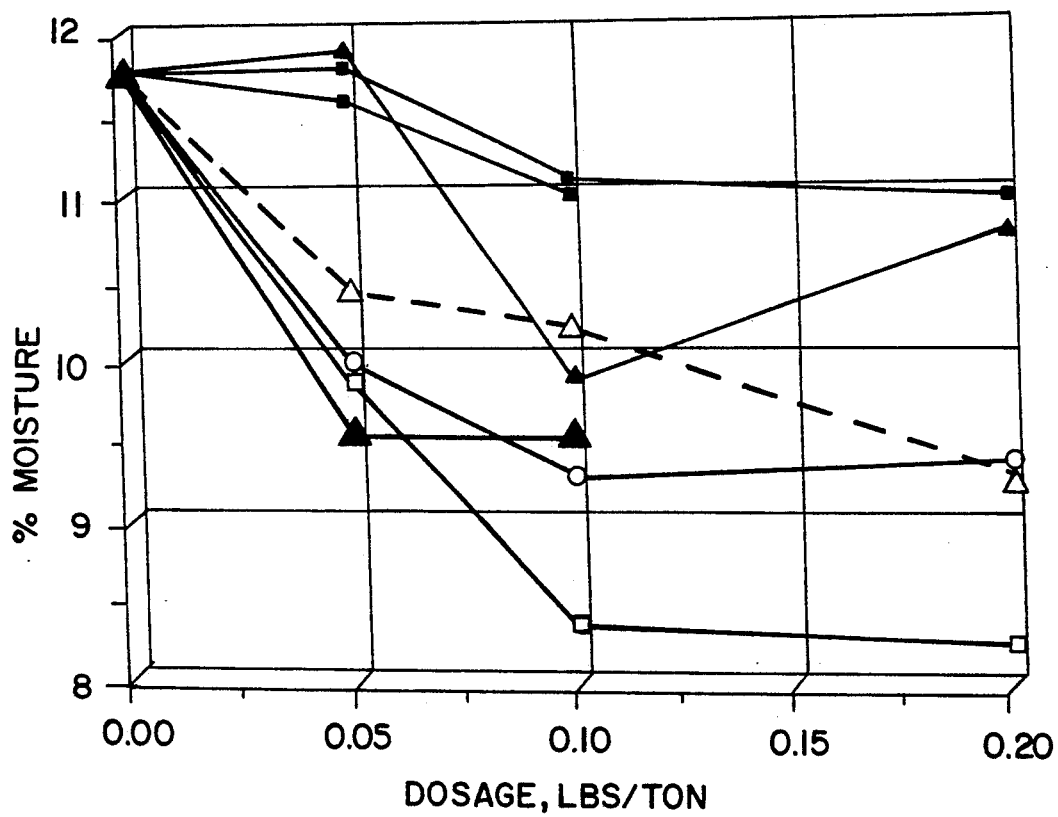

NON-IONIC SURFACTANTS PLUS FATTY-ACIDS AS DEWATERING AIDS FOR ALUMINA TRIHYDRATE

SUMMARY OF THE INVENTION

Fatty acids when combined with certain non-ionic surfactants provide superior dewatering agents for Bayer Process alumina trihydrate filter cakes.

Alumina trihydrate (also known as aluminum hydroxide) is produced on an industrial scale by the Bayer Process. In this process, a supersaturated solution of caustic aluminate is decomposed to afford the particulate product, which is then recovered by means of filtration. During this filtration step, the alumina trihydrate is washed with water to remove residual Bayer liquor from the filter cake. The liquor contains organic and inorganic contaminants which are detrimental to product quality and to process efficiency if allowed to remain in the cake. For example, it is essential to remove residual soda from the filter cake to ensure acceptable purity of product, and to accomplish recovery of the soda.

The use of chemical additives as deliquoring or dewatering aids for alumina trihydrate is known in the art. Such reagents provide lower trihydrate filter cake moisture which result in reduced calcination costs, reduced soda levels in the alumina trihydrate, and greater soda recovery in comparison with analogous operations where dewatering aids are not used.

U.S. No. 4,410,431 claims a method of dewatering a wet, particulate mineral mass which comprises treatment of the wet mineral with a composition comprised of a surfactant having a hydrophile-lipophile balance number of from about 6.0 to 12.0, and a quantity ("surfactant absorption inhibitory amount") of a fatty acid substance such as tall oil fatty acid. Preferred surfactants are composed of the reaction product of one mole of primary aliphatic alcohol containing from 6 to 13 carbon atoms with two to seven moles of ethylene oxide. Tridecyl alcohol is specifically mentioned as a useful alcohol for ethoxylation. This patent does not discuss dewatering alumina trihydrate.

It has been suggested in C.C.A. 99(14):107048T which abstracts Japanese Koki JP 58017814 that certain non-ionic surfactants are useful in the dewatering of alumina trihydrate filtrates.

A formulation of commercial significance covered by U.S. No. 4,410,431 is composed of 60% of 4 moles ethylene oxide on nonylphenol adduct and 40% tall oil fatty acid. This product is hereafter referred to as the "Commercial Product".

This Commercial Product when tested as a dewatering aid for alumina trihydrate gives only fair results. To be commercially useful in the dewatering of alumina trihydrate that better products should be made available to users of the Bayer Process. Accordingly, the present invention is directed to improved dewatering agents for Bayer Process alumina trihydrate filter cakes.

THE DRAWING

The drawing compares the surfactants of the invention in combination with tall oil fatty acids against the same surfactants alone. It also shows the results obtained using the Commercial Product as a dewatering aid for alumina trihydrate filter cakes.

THE INVENTION

The invention provides an improved process for dewatering Bayer Process alumina trihydrate filter cake. The process is of the type wherein a dewatering aid is added to the filter cake wash water prior to its contacting the filter cake. The improvement of this invention comprises using as the dewatering aid a composition comprising from 10-65% by weight of a fatty acid which contains at least 12 carbon atoms. The balance of the composition comprises non-ionic surfactant having an HLB number from 10-14. The surfactant is from the group consisting of:

A. $C_{11}$–$C_{15}$ Secondary Alcohols reacted with 9 moles of ethylene oxide

B. $C_8$–$C_{18}$ aliphatic mono-ethers of an ethylene oxide propylene oxide co-polymer C. $C_9$–$C_{12}$ alkyl phenol ethers of an ethylene oxide propylene oxide block polymer.

The amount of the compositions described above which are useful in dewatering alumina trihydrate slurries range between 0.01–1 lb per ton of the alumina as $Al_2O_3$ contained in the filter cake. Excellent results are usually obtained using a preferred dosage range which is between 0.05–0.5 lb per ton.

THE FATTY ACIDS

The fatty acids used in the invention contain at least 12 and preferably 18 carbon atoms in a aliphatic chain. They may be pure fatty acids although they may mixed fatty acids of the types produced from animal fats and vegetable oils.

A preferred fatty acid used in the practice of the invention are the tall oil fatty acids. The tall oil fatty acids are predominately a mixture of oleic and linoleic acid with minor amounts of linolenic and abietic acids being present. In the compositions of the invention used to dewater alumina trihydrate filter cakes the amount of fatty acid is present in an amount ranging between 10–65% by weight.

THE NON-IONIC SURFACTANT

The non-ionic surfactants used in the formulation of the dewatering aids used in the practice of the invention have an HLB number within the range of 10–14 and preferably within the range of 10–13.5. The preferred surfactants have previously been described generically and have been referred to as surfactants A, B and C. A specific example of a preferred surfactant of type A is the product, TERGITOL 15-S-9. It is manufactured by Union Carbide Corporation. It is composed of 1 mole equivalent of a $C_{11}$–$C_{15}$ carbon atom secondary alcohol reacted with 9 mole equivalent of ethylene oxide. The commercial material is 100% active. It has an average molecular weight of 596 and an HLB of 13.3.

Surfactant B is available in a commercial embodiment under the trade name PLURAFAC RA-20. It is marketed by BASF Corporation. It is the mono-ether of a mixed aliphatic ether with the aliphatic portion of the ether containing between 10–16 carbon atoms. It is described as having a cloud point of 45, a surface tension of 32.8 dynes/cm and HLB of 10.

Surfactant C is typified by the product sold under the trade name SURAX NM 92 manufactured by Glen Corporation located in St. Paul, MN. It is a block ethylene oxide-propylene co-polymer which has as monoether grouping nonylphenol. It has an HLB of 12.

It should be noted in the case of both the SURAX and PLURAFAC materials they are mixed propylene oxide, ethylene oxide co-polymer mono-ethers of either a substituted phenol or fatty alcohol. The block co-polymers of propylene oxide and ethylene oxide usually are prepared by reacting ethylene oxide with a starting moiety of polypropylene oxide units. The polymers of this type as well as the so called corresponding heteric polymers e g. random co-polymers of propylene oxide and ethylene oxide when used in the practice of this invention in the form of ethers have a unique property in that they exhibit inverse solubility in water, that is to say that they tend to become less soluble in hot water than they are in cold water. This is believed to be a distinguishing factor in delineating the type of non-ionic surfactants that are useful in the practice of the invention when combined with the fatty acids.

THE PROPORTIONS OF FATTY ACID TO NON-IONIC SURFACTANTS

The weight ratios of fatty acid to the non-ionic surfactants described above may vary between 1:9 to 2:1. Preferably the ratio is 2:3. As earlier indicated the fatty acid is normally present in the formula in ranges between 10–65% by weight.

EVALUATION OF THE INVENTION

Dewatering agents for alumina trihydrate filtration may be evaluated in the laboratory with an ordinary vacuum filtration apparatus. A slurry composed of 200 grams of alumina trihydrate and 200 cc of the mother liquor from the Bayer process are heated to approximately 85° C. and deliquored on a vacuum filter for a fixed time interval (ca. 2 min.). The deliquored cake is then rinsed with an aliquot of heated water containing the dose of dewatering agent while applying a vacuum continuously for a fixed time interval (ca. 2 min.). The moisture content of the resulting filter cake is then determined by determining the mass before and after drying in an oven. This procedure was employed to generate the data depicted in the drawing.

The laboratory apparatus produced a filter cake which was water washed with varying additives including the Commercial Product previously described, the surfactants A, B and C described previously. These surfactants combined with the fatty acids were also evaluated. The results of these tests are presented in the drawing The results are also summarized as follows:

A. When no dewatering aid is applied during the filtration of alumina trihydrate, the resulting filter cake has a moisture of 11.73%

B. When 0.10 lb of the Commercial Product per ton of trihydrate is applied during filtration, the resulting filter cake has a % Moisture Content of 10.19%.

C. When the formulation containing the surfactant PLURAFAC RA-20 and tall oil is employed at a dosage of 0.10 lb per ton of trihydrate, the resulting filter cake has a % Moisture Content of 8.36%

D. When the formulation containing the surfactant TERGITOL 15-S-9 and tall oil is employed as a dewatering aid at a dosage of 0.10 lb per ton of trihydrate, the resulting filter cake has a % Moisture Content of 9.26%.

E. When the formulation containing the surfactant SURAX NM 92 and tall oil is employed as a dewatering aid at a dosage of 0.10 lb per ton of trihydrate, the resulting filter cake has a % Moisture Content of 9.50%. Each of the three surfactants, when combined with tall oil fatty acid in 3:2 ratio, affords dewatering aids which are superior to the Commercial Product in their ability to reduce the % Moisture Content of alumina trihydrate filter cake at comparable dosages.

I claim:

1. An improved process for dewatering Bayer Process alumina trihydrate filter cake of the type wherein a dewatering aid is added to the filter cake wash water prior to its contacting the filter cake the improvement which comprises using as the dewatering aid a composition comprising a tall oil fatty acid and surfactant having an HLB number from 10–14 from the group consisting of:
   A. $C_{11}$–$C_{15}$ Secondary Alcohols reacted with 9 moles of ethylene oxide
   B. $C_8$–$C_{18}$ aliphatic mono-ethers of an ethylene oxide-propylene oxide co-polymer
   C. $C_9C_{12}$ alkyl phenol ethers of an ethylene oxide propylene oxide block polymer wherein the weight ratio of tall oil fatty acid to non-ionic surfactant in said composition is within he range of 1:9 to 2:1.

2. The improved process of claim 1 where the non-ionic surfactant is A.

3. The improved process of claim 1 where the non-ionic surfactant is B.

4. The improved process of claim 1 where the non-ionic surfactant is C.

* * * * *

UNITED STATES PATENT AND TRADEMARK OFFICE
CERTIFICATE OF CORRECTION

PATENT NO. : 5,167,831

DATED : December 1, 1992

INVENTOR(S) : Peter A. Dimas

It is certified that error appears in the above-identified patent and that said Letters Patent is hereby corrected as shown below:

Column 4, Claim 1, Line 32 tion comprising a tall oil fatty acid and surfactant hav-

LETTERS PATENT SHOULD READ AS:

tion comprising a tall oil fatty acid and <u>a non-ionic</u> surfactant hav-

Signed and Sealed this

Twelfth Day of October, 1993

Attest:

Attesting Officer

BRUCE LEHMAN

Commissioner of Patents and Trademarks